April 9, 1935.  E. M. TANIGUCHI  1,997,240
AIRCRAFT
Filed June 25, 1934   4 Sheets-Sheet 3

Inventor
E. M. Taniguchi
By Clarence A. O'Brien
Attorney

April 9, 1935.  E. M. TANIGUCHI  1,997,240
AIRCRAFT
Filed June 25, 1934  4 Sheets-Sheet 4

Inventor
E. M. Taniguchi
By Clarence A. O'Brien
Attorney

Patented Apr. 9, 1935

1,997,240

UNITED STATES PATENT OFFICE 1,997,240

AIRCRAFT

Edwin M. Taniguchi, San Francisco, Calif.

Application June 25, 1934, Serial No. 732,312

5 Claims. (Cl. 244—15)

The present invention relates to new and useful improvements in aircraft of the heavier than air type and has for one of its important objects to provide, in a manner as hereinafter set forth, a novel construction, combination and arrangement of parts through the medium of which take-offs and landings may be accomplished in safety at comparatively low speed and in comparatively small or restricted areas.

Another very important object of the invention is to provide an aircraft of the aforementioned character which may be easily and effectively maneuvered or controlled at various speeds within a wide range when in flight.

Other objects of the invention are to provide an aircraft of the character described which will be comparatively simple in construction, strong, durable, safe, compact and which may be manufactured and operated at low cost.

All of the foregoing and still further objects and advantages of the invention will become apparent from a study of the following specification, taken in connection with the accompanying drawings wherein like characters of reference designate corresponding parts throughout the several views, and wherein:—

Figure 5 is a detail view in vertical section, showing the means for mounting the combination retarding, stabilizing and elevating propeller on its shaft.

Figure 6 is a detail view in horizontal section through the drive gear unit.

Figure 1:
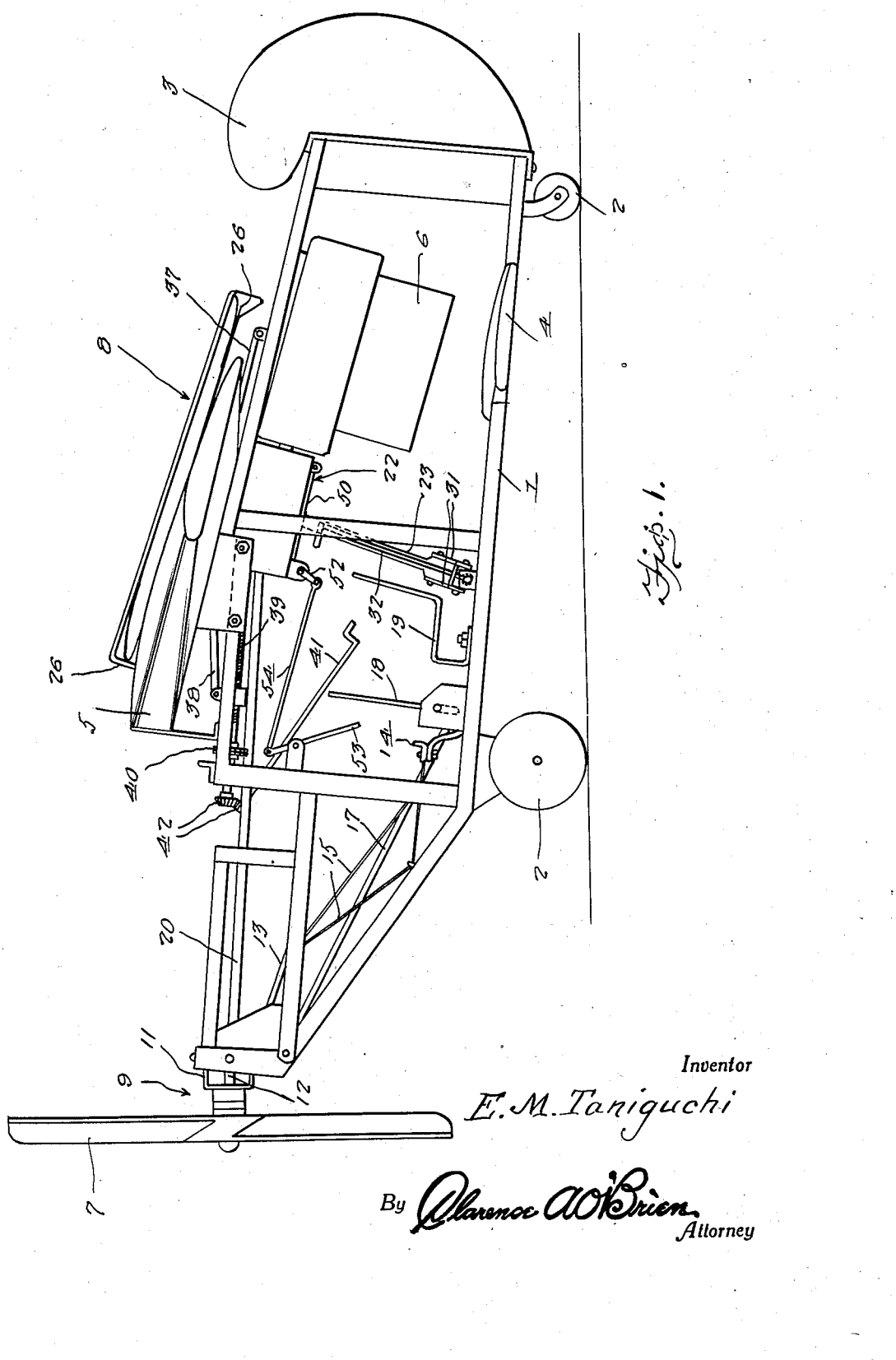
Figure 1 is a view in side elevation of an aircraft constructed in accordance with the present invention.

Referring now to the drawings in detail, it will be seen that the embodiment of the invention which has been illustrated is of the cabin monoplane type and includes a fuselage 1 which is mounted on supporting wheels 2. On the rear end portion or tail of the fuselage 1 is a rudder 3 and a stabilizer and elevator 4. The fuselage 1 is mounted beneath a wing 5 which, as illustrated to advantage in Figure 2 of the drawings, is substantially V-shaped.

The engine 6 of the aircraft is mounted in an upper rear portion of the fuselage 1 and said engine drives a thrust or tractor propeller 7 and a combination retarding, stabilizing and elevating propeller which is designated generally by the reference numeral 8. The propeller 7 is mounted for universal swinging adjustment in the nose of the fuselage 1 through the medium of a mounting which is designated generally by the reference numeral 9. The mounting 9 includes a substantially rectangular metallic frame 10 which is pivotally mounted for swinging movement in a vertical plane in the nose of the fuselage 1, and a substantially U-shaped bracket 11 which is pivotally mounted for swinging movement in a horizontal plane in said frame 10. The stub shaft 12 to which the propeller 7 is fixed is journaled in the bracket 11. An arm 13 extends rearwardly from the bracket 11 and is operatively connected to the usual foot actuated rudder bar 14 through the medium of cables 15 which travel over pulleys 16 for swinging the propeller 7 laterally. A rod 17 operatively connects the frame 10 to the usual control stick or lever 18 for swinging the propeller 7 in a vertical plane. The reference numeral 19 designates the operator's or pilot's seat which, of course, is adjacent the control members 14 and 18. The stub shaft 12 of the propeller 7 is connected to a drive shaft 20 by a suitable universal joint 21. The engine 6 drives the shaft 20 through a gear unit which is designated generally by the reference numeral 22.

Figure 2:
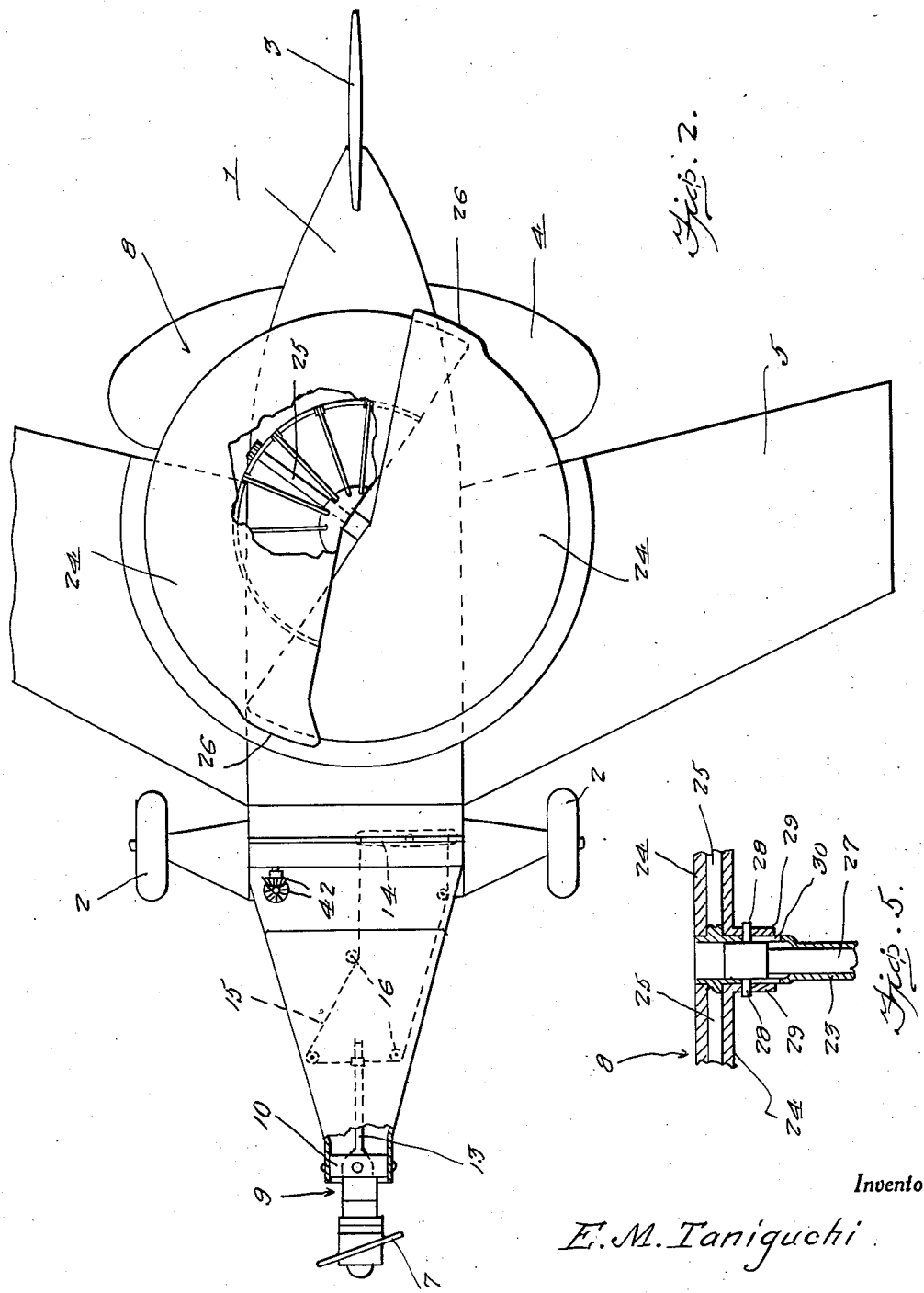
Figure 2 is a view in top plan thereof, showing portions broken away in section.
Figure 3:
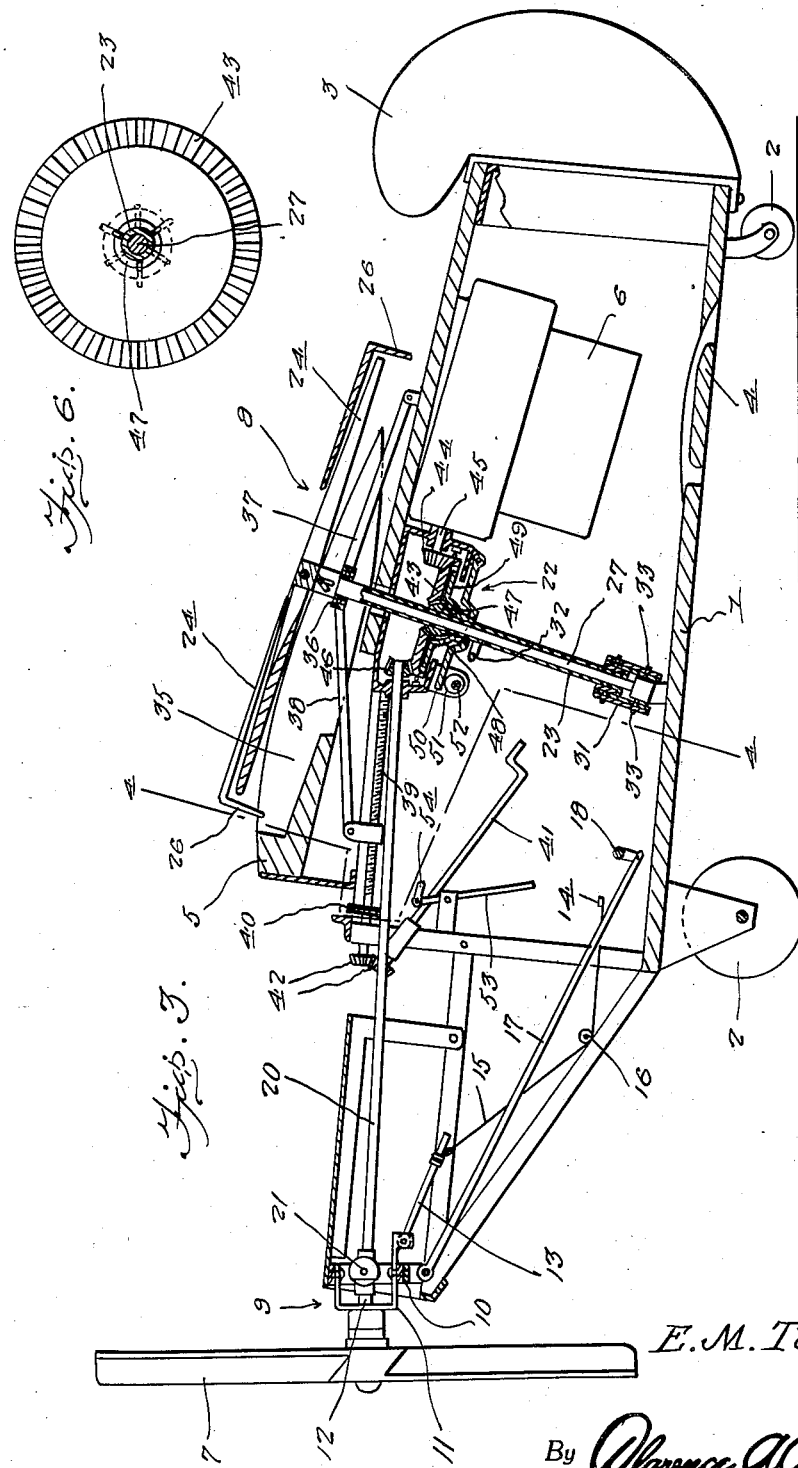
Figure 3 is a view in vertical longitudinal section through the invention.

The propeller 8 is mounted on the upper end of a tubular shaft 23 which extends slidably and rotatably through the gear unit 22, said propeller 8 comprising a pair of substantially segmental, feathering blades 24 which are journaled, at an intermediate point, for swinging movement on shafts 25 (see Figure 5) which project from the upper end portion of said tubular shaft 23. As best seen in Figure 2 of the drawings, the leading edge of each of the blades 24 overlaps the trailing edge of the other of said blades 24. Peripheral fins 26 depend from the leading portions of the blades 24 for preventing disturbance of the air or eddies at these points when the propeller 8 is rotating.

Slidably mounted in the tubular shaft or column 23 is a blade adjusting shaft 27 having projecting from its upper end portion pins 28 which are operatively engaged in oppositely inclined slots which are provided therefor in plates 29 which are fixed to the blades 24 and which depend therefrom. The pins 28 travel in slots 30 (see Figure 5) which are provided therefor in the enlarged upper end portion of the tubular shaft 23. It will thus be seen that when the shaft 27 is reciprocated in the tubular shaft 23 the blades 24 of the propeller 8 may be swung to open or closed position relative to each other. When the blades 24 are in closed position the propeller 8 is substantially in the form of a stabilizing disk.

Figure 4:
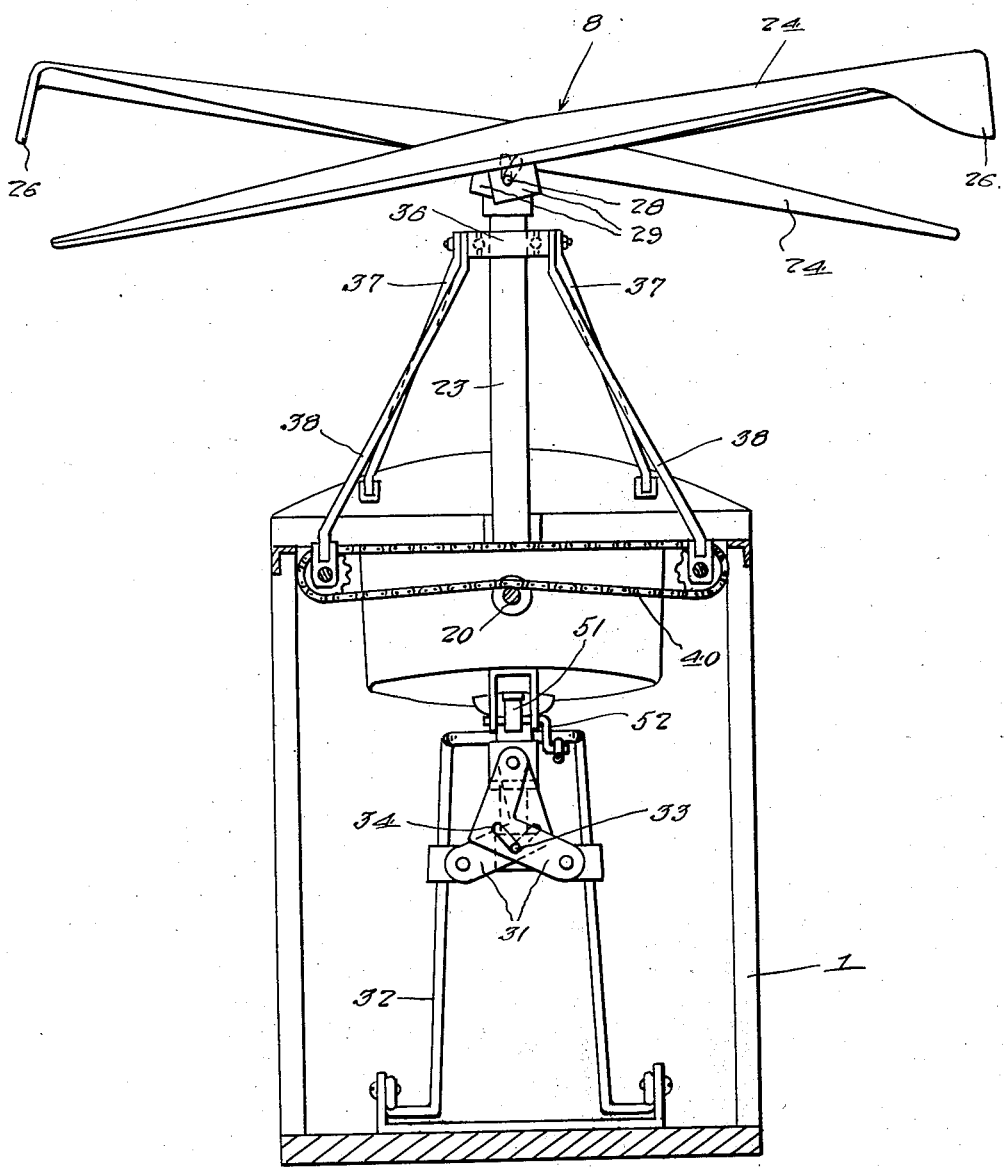
Figure 4 is a view in transverse section, taken substantially on the line 4—4 of Figure 3.

Referring now to Figure 4 of the drawings, it will be seen that a pair of angular levers 31 are pivotally mounted for swinging movement on the lower end portion of the tubular shaft 23. The levers 31 are slidably connected to the upwardly converging legs of a substantially U-shaped guide 32 which is mounted in the fuselage 1. Pins 33 project from the lower end of the blade adjusting shaft 27 and said pins are engaged in inclined cam slots 34 which are provided therefor in the angular levers 31. From the foregoing it will be seen that, when the propeller 8 is raised or lowered in a manner to be presently described, the shaft 27 will be reciprocated in the tubular shaft 23 for feathering the blades 24. The wing 5 has formed therein a circular recess or well 35 for the reception of the propeller 8 when said propeller is in lowered or retracted position.

The tubular shaft 23 is journaled in a collar 36 to which one end of a pair of arms 37 are pivotally connected, the other ends of said arms 37 being pivotally connected to the top of the fuselage 1. Also pivotally connected to the collar 36 is a pair of elevating arms 38, the forward ends of which are pivotally and threadedly connected to a pair of screw shafts 39 which are mounted longitudinally in the fuselage 1. The previously mentioned enlarged upper end portion of the tubular shaft 23 provides a shoulder beneath which the collar 36 is engaged. However, the tubular shaft 23 may be supported in any suitable manner on the collar 36. The screw shafts 39 are connected with each other for operation in unison by a chain and sprocket connection 40. The screw shafts 39 are adapted to be actuated through the medium of a crank shaft 41 which, of course, is operable from the seat 19. Gears 42 connect the crank shaft 41 with one of the screw shafts 39. As is believed to be readily apparent, when the screw shafts 39 are actuated the propeller 8 is raised or lowered through the medium of the arms 38 and it may be well to here state that the mounting of said propeller 8 is such that when elevated it is also swung to a rearwardly inclined position.

The unit 22 includes a ring gear 43 through which the tubular shaft 23 rotatably and slidably extends. A gear 44, on the engine shaft 45 drives the gear 43 and said gear 43, in turn, drives the shaft 20 through the medium of a gear 46 on said shaft 20 which is engaged with the gear 43. A ball 47 is splined on the tubular shaft 23 and said ball is engaged in a socket 48 which slidably encircles said tubular shaft 23. The socket 48 is provided with a flange or disk 49 which is adapted to frictionally engage the lower side of the gear 43 for actuation thereby. The socket 48 is rockably connected to the ball 47 through the medium of pins which project from said ball and which are engaged in vertical slots provided therefor in said socket. In this manner the ball and socket are connected with each other for rotation in unison. The socket 48 further includes a depending neck portion which encircles the tubular shaft 23 and which is engaged by a pivoted lever 50 having an opening therein through which the shaft 23 passes. The lever 50 is actuated for engaging the flange or disk 49 with the gear 43 by a cam 51 which is fixed on a shaft 52 which, in turn, is operatively connected to a hand lever 53, which is operable from the seat 19 by a rod 54. In this manner the propeller 8 may be connected to the engine 6 for actuation thereby or disconnected therefrom, as desired.

It is believed that the operation of the aircraft will be readily apparent from a consideration of the foregoing, particularly to those skilled in the art to which the invention pertains. When the rudder bar 14 is actuated to shift the rudder 3 and the usual ailerons of the plane, the thrust propeller 7 will be simultaneously swung laterally in the same direction that said rudder 3 is moved in. When the usual elevator of the plane is actuated through the medium of the control stick or lever 18 the propeller 7 will be swung in a similar direction to assist in climbing. As hereinbefore stated, when the propeller 8 is raised the blades 24 thereof are automatically feathered. Thus, when the propeller 8 is raised to its rearwardly inclined position and is being actuated by the engine 6 it will exert a retarding and supporting force for permitting the plane to be landed in a comparatively restricted area at low speed. Further, the propeller 8 is shaped to function substantially in the manner of a wing or supporting surface and, still further, when the blades of the propeller 8 are closed and said propeller is in lowered position in the wing 5, said propeller, when actuated by the engine 6, functions as a stabilizer, utilizing the principle of a gyroscope. It may be well to here state that the propeller 8 is driven at considerably lower speed than the propeller 7.

It is believed that the aforementioned and many other advantages of an aircraft constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. An aircraft of the class described and in combination, a fuselage, a wing carried by the fuselage and formed with a circular well in the upper surface thereof, control surfaces mounted on the fuselage, a thrust propeller mounted for universal swinging movement on the forward end of the fuselage, operating means connected with the thrust propeller and control surfaces for actuating said propeller and surfaces in unison, a power plant mounted in the fuselage and operatively connected with the thrust propeller, a second propeller supported in the fuselage for movement into and out of the well in the wing to stabilize the aeroplane in the innermost position and reduce landing range in the outermost position, actuating means to raise and lower the second propeller, said actuating means simultaneously moving the blades of the second propeller on their axis when raising or lowering said second propeller, and clutch controlled means operatively connecting the second propeller to the power plant for selective actuation thereby.

2. An aircraft of the class described and in combination, a fuselage, a wing carried by the fuselage and formed with a circular well in the upper surface thereof, a thrust propeller on the forward end of the fuselage, a power plant in the fuselage operatively connected with the thrust propeller, a second propeller movably supported in the fuselage for movement into and out of the well in the wing to stabilize the aeroplane in innermost position and reduce landing range in the outermost position, actuating means to raise and lower the propeller, said actuating means simultaneously moving the blades of the second propeller on their axis when raising or lowering said second propeller, and clutch controlled means operatively connecting the second propeller to the power plant for selective actuation thereby.

3. An aeroplane of the character described and in combination, a fuselage, a wing carried by the fuselage formed with a circular well in the upper surface thereof, a power plant mounted in the fuselage, a thrust propeller mounted in the forward end of the fuselage and operatively connected with power plant, a second propeller supported by the fuselage for axial movement into and out of the well in the wing to stabilize the aeroplane in the innermost position and reduce landing range in the outermost position, and means for selectively and operatively connecting the power plant with the second propeller.

4. A control and drive assembly for aeroplane the latter characterized by a fuselage carrying a wing and control surfaces comprising a power unit mounted in the fuselage, a rectangular frame pivoted to the forward end of the fuselage for swinging movement in a vertical plane, a substantially U-shaped bracket pivoted to the rectangular frame for swinging movement in a horizontal plane, a drive shaft connected with the power unit extending through the rectangular frame, and journalled in the U-shaped bracket, a universal joint on the drive shaft in proximity of the rectangular frame, a propeller on the forward end of the drive shaft, control means connected with the rectangular and U-shaped frame independent of each other to shift the axis of the propeller in unison with the operation of the control surfaces.

5. A drive and control assembly for combined stabilizer, gyropter, and heliocopter devices for aeroplanes, the latter characterized by a fuselage, wing and thrust propeller comprising; a power unit mounted in the fuselage including a gear transmission for the thrust propeller; the wing of the aeroplane formed with a circular well in the upper surface thereof; a tubular drive shaft and a non-rotatable blade actuating shaft confined within the drive shaft both being movable axially in unison; a propeller formed with rockable blades, the propeller connected with the drive shaft and the blades connected with the actuating shaft; said drive shaft splined to a clutch mechanism and extending through the gear transmission; said clutch mechanism selectively engageable with the gear transmission; operating mechanism for elevating the propeller mounted in the fuselage, a bearing collar on the drive shaft; elevating arms pivoted at one end to the collar; and certain of said arms pivoted at their other ends to the fuselage, and others of said arms slidable on the elevating operating mechanism for moving the propeller into and out of the well in the wing and simultaneously moving the blades on their axis.

EDWIN M. TANIGUCHI.